(12) United States Patent
Wu

(10) Patent No.: US 11,958,172 B2
(45) Date of Patent: Apr. 16, 2024

(54) TORQUE TOOL USING COLORS FOR IDENTIFICATION

(71) Applicant: MATATAKITOYO TOOL CO., LTD., Taichung (TW)

(72) Inventor: Yi-Min Wu, Taichung (TW)

(*) Notice: Subject to any disclaimer, the term of this patent is extended or adjusted under 35 U.S.C. 154(b) by 478 days.

(21) Appl. No.: 17/315,359

(22) Filed: May 10, 2021

(65) Prior Publication Data

US 2022/0355448 A1 Nov. 10, 2022

(51) Int. Cl.
*B25B 23/142* (2006.01)
*B25B 13/56* (2006.01)
*G01L 5/24* (2006.01)

(52) U.S. Cl.
CPC .......... *B25B 23/1427* (2013.01); *B25B 13/56* (2013.01); *G01L 5/24* (2013.01)

(58) Field of Classification Search
CPC ... B25B 23/14; B25B 23/142; B25B 23/1422; B25B 23/1427; B25B 13/56; B25B 23/0007; B25B 23/0035; G01L 5/24
See application file for complete search history.

(56) References Cited

U.S. PATENT DOCUMENTS

| 4,982,627 | A | 1/1991 | Johnson |
| 7,836,781 | B1 | 11/2010 | Chen |
| 2009/0120247 | A1* | 5/2009 | Hsieh .................. B25B 23/1425 81/177.1 |
| 2011/0036214 | A1* | 2/2011 | Potterfield .............. B25B 13/48 206/374 |

* cited by examiner

*Primary Examiner* — Benjamin R Schmitt
(74) *Attorney, Agent, or Firm* — Bruce Stone LLP; Joseph A. Bruce

(57) ABSTRACT

A torque tool includes multiple bits, a handle, a pointer and a scale ring. Each of the bits includes a colored area. In use, the handle is connected to a selected one of the bits. The handle is operable to set multiple maximum values of torque transferable to the bit from the handle corresponding to the colored areas of the bits. The pointer is formed on the handle. The scale ring includes multiple colored areas corresponding to the colored areas of the bits. The scale ring is rotated around the handle as the handle is operated to set the maximum values of torque, thereby aligning the pointer with one of the colored areas of the scale ring corresponding to the colored area of a selected one of the bits.

17 Claims, 17 Drawing Sheets

TORQUE TOOL USING COLORS FOR IDENTIFICATION

BACKGROUND OF INVENTION

1. Field of Invention

The present invention relates to torque tools and, more particularly, to a torque using colors for identification.

2. Related Prior Art

There are various tools such as box-ended wrenches, open-ended wrenches, adjustable wrenches, Allen keys, socket wrenches and related components. Pressing or printing is often used to provide a tool with an inscription to show a trademark, an aesthetic pattern or the size of the tool.

The use of the above-mentioned processes to make the inscription is not without any problem particularly where the inscription is used to show the size of the tool. For example, a user may have to wipe grease from the tool to read the inscription to know the size of the tool for the inscription is often covered entirely or partially by grease. Moreover, the user may have to flip the tool over to read the inscription since the inscription is often supported on a lower face of the tool in an operative position.

U.S. Pat. No. 4,982,627 discloses a tool-identifying system in which a color chart shows a range of ten colors and each color indicates a particular numeral. A sequence of indicated numerals represents the value of the size of a tool, in fractional inch or metric size. However, a user has to memorize the correspondence of the colors to the numerals. The user will experience troubles in picking bits of the right sizes might if he or she forgets the correspondence. Accordingly, the user may bring bits of wrong sizes to a working site and fail a task. Alternatively, the user may be forced to bring bits of all sizes to the working site, and this is quite a burden. In operation, the user may pick bits of wrong sizes before getting the bit of the right size, and this is a waste of time.

CN 2118617 discloses an adjustable wrench including a handle, a jaw formed on the handle, another jaw movably connected to the handle, a scale in fractional inch, and another scale in metric size. Each scale provides the correspondence of the value of each size to an actual with of a gap between the jaws. However, the scales could be covered with grease or steins.

Moreover, no wrench has been provided with anything to let a user know an adequate value of torque to be imposed on a workpiece such as a nut and a threaded bolt without causing damages to the workpiece. Hence, the user might not exert an inadequate value of torque to engage a nut with a threaded bolt so that the nut could easily be disengaged from the threaded bolt because of vibration.

The present invention is therefore intended to obviate or at least alleviate the problems encountered in the prior art.

SUMMARY OF INVENTION

It is the primary objective of the present invention to provide a torque tool using colors for identification.

To achieve the foregoing objective, the torque tool includes multiple bits, a handle, a pointer and a scale ring. Each of the bits includes a colored area. In use, the handle is connected to a selected one of the bits. The handle is operable to set multiple maximum values of torque transferable to the bit from the handle corresponding to the colored areas of the bits. The pointer is formed on the handle. The scale ring includes multiple colored areas corresponding to the colored areas of the bits. The scale ring is rotated around the handle as the handle is operated to set the maximum values of torque, thereby aligning the pointer with one of the colored areas of the scale ring corresponding to the colored area of a selected one of the bits.

Other objectives, advantages and features of the present invention will be apparent from the following description referring to the attached drawings.

BRIEF DESCRIPTION OF DRAWINGS

The present invention will be described via detailed illustration of ten embodiments referring to the drawings wherein.

DETAILED DESCRIPTION OF EMBODIMENTS

Figure 1:
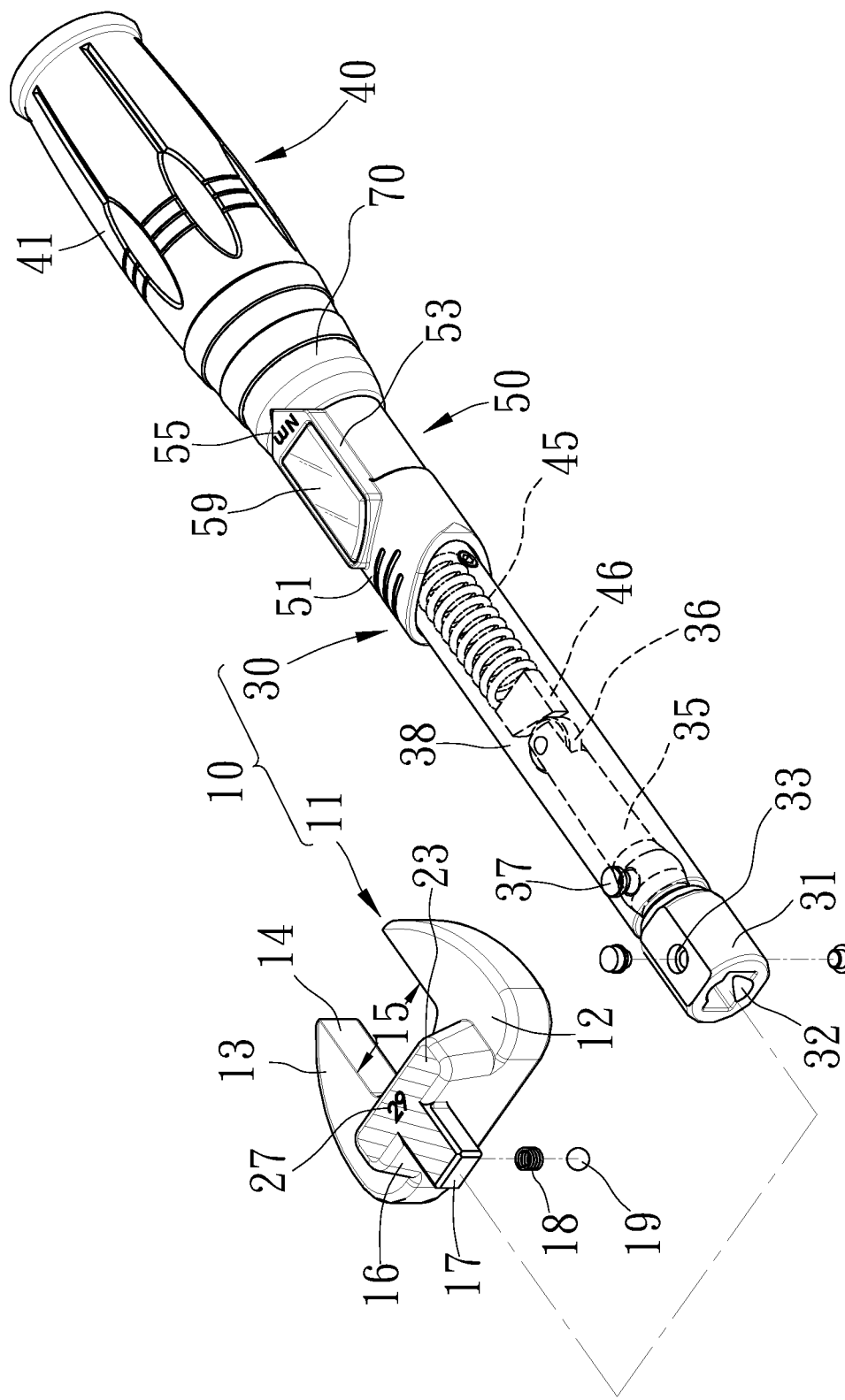
FIG. 1 is a perspective view of a torque tool according to the first embodiment of the present invention.

Referring to FIG. 1, a wrench 10 includes a bit 11 connected to a handle 30 according to a first embodiment of the present invention. The handle 30 includes a rod 35 inserted in a pipe 38. The rod 35 is pivotally connected to the pipe 38 by a pivot 37. A wheel 36 is connected to a rear end of the rod 35, which is inserted in the pipe 38. A joint 31 is formed in one piece with a front end of the rod 35, which is located out of the pipe 38. Thus, the joint 31 is located out of the pipe 38. The joint 31 includes a bore 32 in a front end.

Two apertures 33 are respectively made in two opposite sides of the joint 31 so that the apertures 33 are in communication with the bore 32. A button 34 is inserted in each of the apertures 33. The buttons 34 are kept on the joint 31 and away from the bore 32.

The handle 30 further includes a torque-adjusting mechanism 40 including a grip 41, a threaded rod 43, a threaded sleeve 44, a spring 45, a wedge 46, a bearing 47, a connector 48 and a controller 49. The spring 45 is inserted in the pipe 38. The wedge 46 is connected to a front end of the spring 45. Thus, the spring 45 abuts the wedge 46 against the wheel 36, which is connected to the rod 35.

Figure 2:
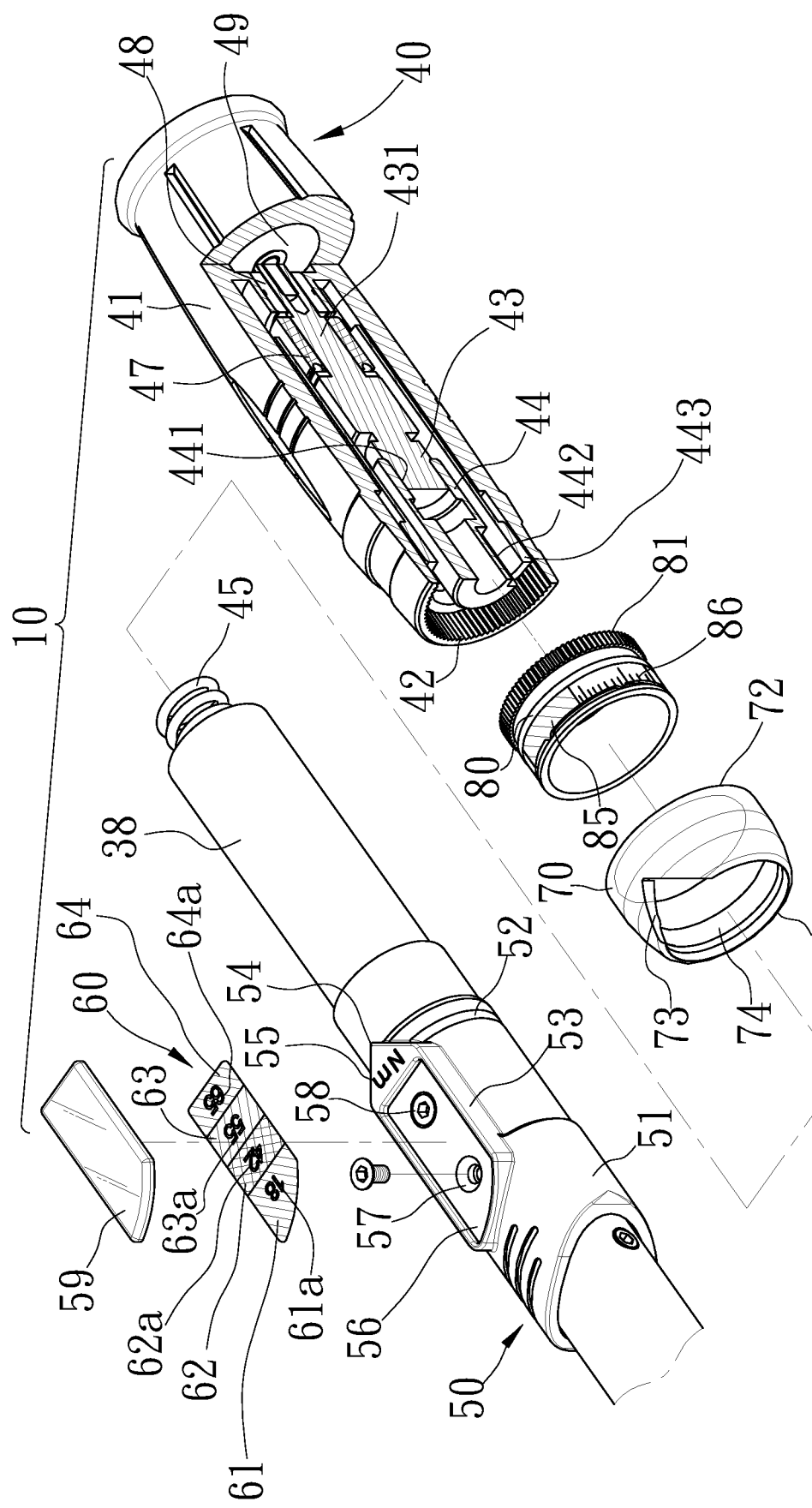
FIG. 2 is an enlarged, partial and exploded view of the torque tool shown in FIG. 1.
Figure 3:
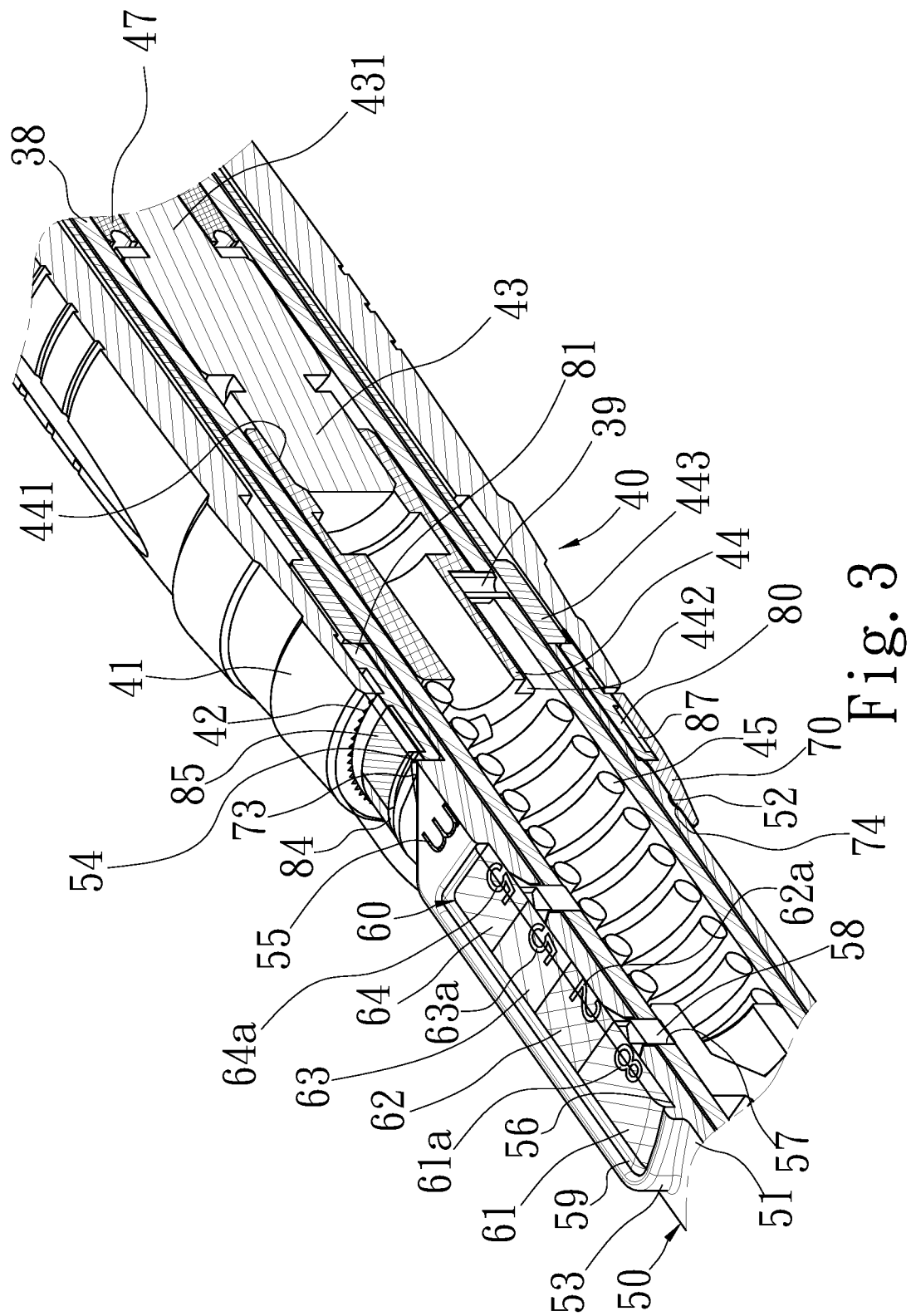
FIG. 3 is an enlarged, partial and cut-away view of the torque tool shown in FIG. 1.

Referring to FIGS. 2 and 3, the grip 41 extends around a rear section of the pipe 38 so that the former is allowed to rotate around the latter. The rear section of the pipe 38 receives the threaded rod 43 and the threaded sleeve 44. The threaded rod 43 includes a shank 431 supported by the bearing 47, which is fitted in the rear section of the pipe 38. The threaded sleeve 44 includes a thread 441 formed on an internal face and a groove 442 longitudinally made in an external face. The thread 441 of the threaded sleeve 44 is engaged with a thread (not numbered) of the threaded rod 43. A front end of the threaded sleeve 44 is abutted against a spring 45 that is inserted in rear section of the pipe 38. A pin 39 is inserted in the groove 442 via the pipe 38 to prevent the threaded sleeve 44 from rotation in the pipe 38 but allow the threaded sleeve 44 to translate in the pipe 38. The pin 39 is used to abut against a closed end of the groove 442 to set an end for the translation of the threaded sleeve 44 in the pipe 38. A positioning collar 443 is inserted in the grip 41. Moreover, the positioning collar 443 is fitted on the rear section of the pipe 38 so that they are not movable relative to each other. Furthermore, the positioning collar 443 keeps the pin 39 in the pipe 38.

The connector 48 is an annular element that is fitted between the grip 41 and on the shank 431 so that the grip 41 is rotatable with the threaded rod 43. The shank 431 is inserted in the controller 49, which is an annular element. The controller 49 is allowed to translate in the grip 41 in a longitudinal direction of the handle 30 between a locking position and an unlocking position. In the locking position, the controller 49 prevents the grip 41 from rotation around the pipe 38. In the unlocking position, the controller 49 allows the grip 41 to rotate around the pipe 38. Details of the structure of the controller 49 and its relation to the other elements are not the spirit of the present invention and hence will not be given here. However, details of the structure of the controller 49 and its relation to the other elements can be found in U.S. Pat. No. 7,836,781.

The handle 30 further includes an indicating unit 50 including a ring 51, a transparent panel 59, a label 60, a lens 70 and a scale ring 80. The ring 51 includes a frame 53 and a pointer 54 on an external face. The pointer 54 is a pointed portion of the frame 53. In addition, the ring 51 further includes a cavity 56 in the frame 53 and two apertures 57 in communication with the cavity 56. A middle section of the pipe 38 is inserted in the ring 51. Two screws 58 are inserted in the pipe 38 via the apertures 57 of the ring 51 so that the ring 51 is kept in position, next to the positioning collar 443. A unit of torque 55 such as Nm is inscribed in or printed on the frame 53, between the pointer 54 and the cavity 56.

Preferably, the label 60 is a sheet of a proper material inserted in the cavity 56. A transparent panel 59 is fitted in the frame 53 so that the transparent panel 59 keeps the label 60 in the cavity 56. The label 60 is printed with four colored areas 61, 62, 63 and 64 for example. Preferably, the label 60 is further printed with four numbers 61a, 62a, 63a and 64a respectively located in the colored areas 61, 62, 63 and 64 to represent four values of torque. The numbers 61a, 62a, 63a and 64a are respectively "18", "42", "55" and "65" for example. The colored areas 61, 62, 63 and 64 and the numbers 61a, 62a, 63a and 64a are observable via the transparent panel 59, but not the screws 58.

In another embodiment, the label 60 can be a layer of paint, ink or the like coated on a lower face of the transparent panel 59. Thus, the label 60 is observable via the transparent panel 59, too. Similarly, the colored areas 61, 62, 63 and 64 and the numbers 61a, 62a, 63a and 64a are observable via the transparent panel 59, but not the screws 58.

A section of the ring 51 is inserted in the scale ring 80 so that the scale ring 80 is located between the pointer 54 and the positioning collar 443 in the longitudinal direction of the handle 30. The scale ring 80 is allowed to rotate on the ring 51, but not translate on the ring 51. The scale ring 80 is formed with teeth 81 on an external face. The teeth 81 are engaged with teeth 42 formed on an internal face of the grip 41 so that the scale 80 is rotatable with the grip 41.

Referring to FIGS. 4 through 7, four colored areas 82, 83, 84 and 85 are inserted in a recess 87 made in an external face of the scale ring 80, and so is a scale 86. The scale 86 is located between the colored areas 82 and 85.

The lens 70 is an annular element formed with two open ends 71 and 72. The lens 70 extends around the ring 51. The lens 70 includes an internal flange 74 inserted in a groove 52 made in the external face of the ring 51, thereby keeping the lens 70 in position on the ring 51 in the longitudinal direction of the handle 30. At the open end 71, the lens 70 is formed with a notch 73 to receive the pointer 54 to prevent the lens 70 from rotation on the ring 51. The lens 70 extends around and hence protectively covers the scale ring 80. The open end 72 of the lens 70 is pointed at the grip 41.

Referring to FIGS. 1 through 4, the grip 41 is rotated relative to the pipe 38 in a sense of direction so that the threaded rod 43 translates the threaded sleeve 44 toward the bearing 47, thereby reducing the load in the spring 45. For the engagement of the teeth 81 with the teeth 42, the scale ring 80 is rotated around the ring 51 to show the maximum value of torque that can be transferred by the handle 30.

The pointer 54 is pointed at the colored area 85 of the scale ring 80 for example. The color of the colored area 85 is identical or similar to the color of the colored area 64. Hence, the maximum value of torque that can be transferred by the handle 30 is 65 Nm as shown by the number 64a, which is located in the colored area 64 of the label 60. In practice, there are inevitably errors in the making of the torque-adjusting mechanism 40 so that the maximum value of torque that can be transferred by the handle 30 is 65±5 Nm when 65 Nm is shown.

The maximum value of torque that can be transferred by the handle 30 is determined by the load in the spring 45. The wheel 36 moves beyond the wedge 46, which is connected to the spring 45 to provide a sound when the value of torque transferred by the handle 30 reaches the maximum, e.g., 65 Nm. Hence, a user knows that the value of torque transferred by the handle 30 reaches the maximum.

Figure 5:
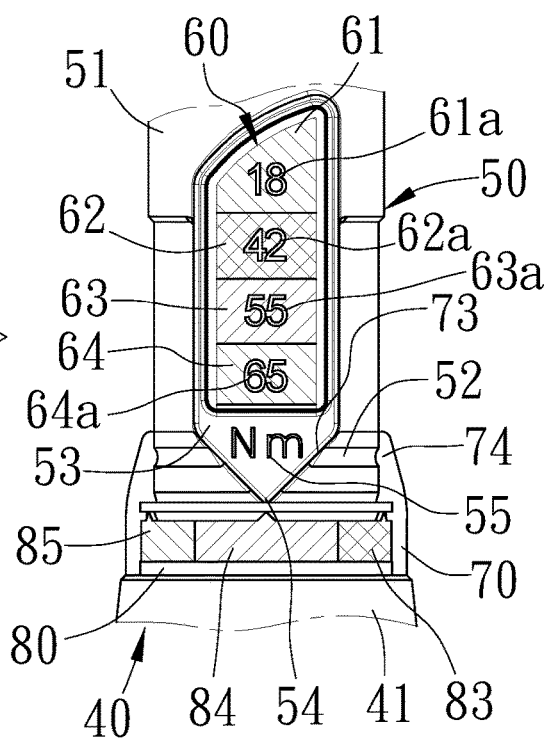

Referring to FIGS. 2, 3 and 5, the grip 41 rotates the threaded rod 43 to translate the threaded sleeve 44 backward to reduce the load in the spring 45. Due to the engagement of the teeth 81 with teeth 42, the scale ring 80 is rotated with the ring 51 to immediately represent the maximum value of torque that can be transferred by the handle 30.

When the pointer 54 is pointed at the colored area 84, it is easily observed that the maximum value of torque that can be transferred by the handle 30 is 55±5 Nm as shown by the number 63a, which is located in the colored area 63 since the color of the colored area 84 is identical or similar to the color of the colored area 63. There is no need to memorizing or calculation to know the relation of the colored area 84 to the colored area 63.

Figure 6:
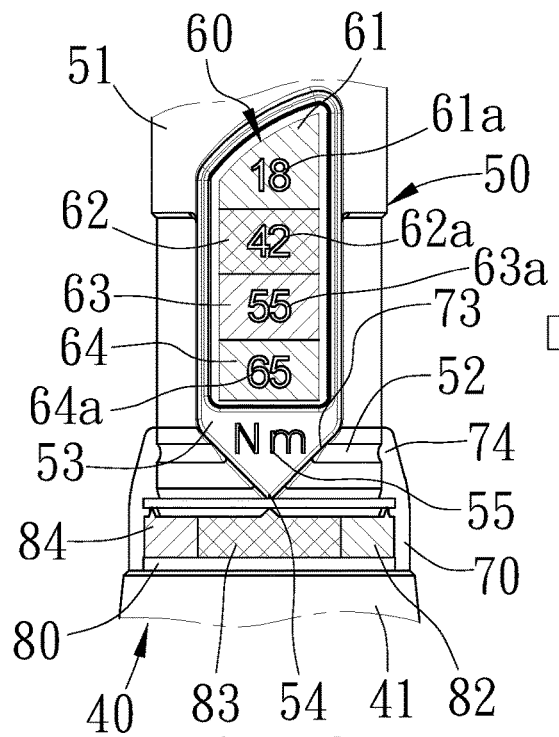

Referring to FIGS. 2, 3 and 6, the above-described process is repeated to change the maximum value of torque that can be transferred by the handle 30. The pointer 54 is pointed at the colored area 83 corresponding to the number 62a located in the colored area 62. It is easily observed that the maximum value of torque that can be transferred by the handle 30 is 42±5 Nm as shown by the number 62a without any need for memorizing or calculation.

Figure 7:
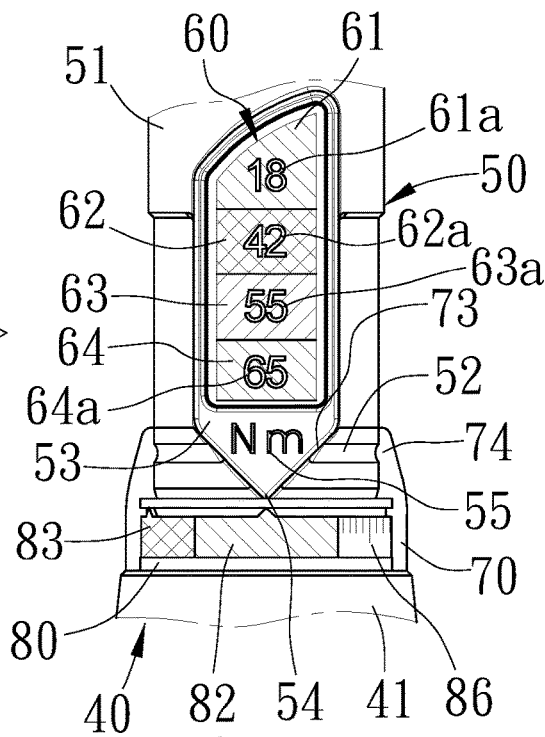

Referring to FIGS. 2, 3 and 7, the above-described process is repeated to change the maximum value of torque that can be transferred by the handle 30. The pointer 54 is pointed at the colored area 82 corresponding to the number 61a located in the colored area 61. It is easily observed that the maximum value of torque that can be transferred by the handle 30 is 18±5 Nm as shown by the number 61a without any need for memorizing or calculation.

Referring to FIG. 1 again, the bit 11 includes a head 12 formed with two stationary jaws 13 separated from each other by a distance 15. Each of the stationary jaws 13 is formed with a contact face 14 so that the contact faces 14 of the stationary jaws 13 extend parallel to each other. The head 12 includes a raised portion 16 formed on an upper face and an insert 17 extending backward from the raised portion 16. The insert 17 includes a recess (FIG. 9) in a lower face to receive a spring 18 and a ball 19. The spring 18 is compressed between a closed end of the recess of the insert 17 and a first portion of the ball 19 so that a second portion of the ball 19 extends from the insert 17 via an open end of the recess of the insert 17. The first portion of the ball 19 is kept in the recess of the insert 17. A colored layer 23 covers an upper face of the raised portion 16 of the bit 11 and an upper face of the insert 17. An identification symbol 27 is supported on the upper face of the raised portion 16 of the bit 11. The symbol 27 shows "29."

Figure 8:
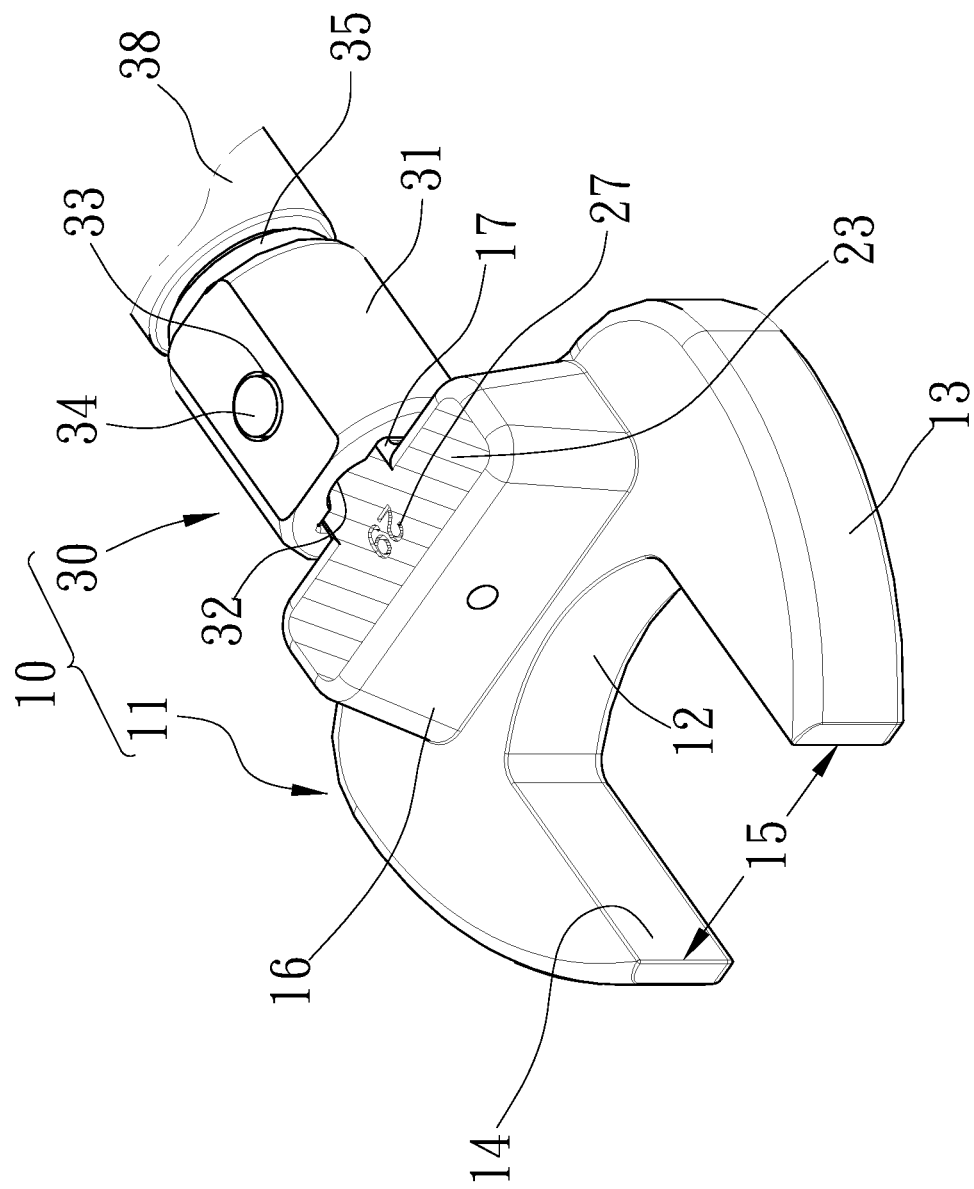
FIG. 8 is an enlarged perspective view of a bit of the torque tool shown in FIG. 1.
Figure 9:
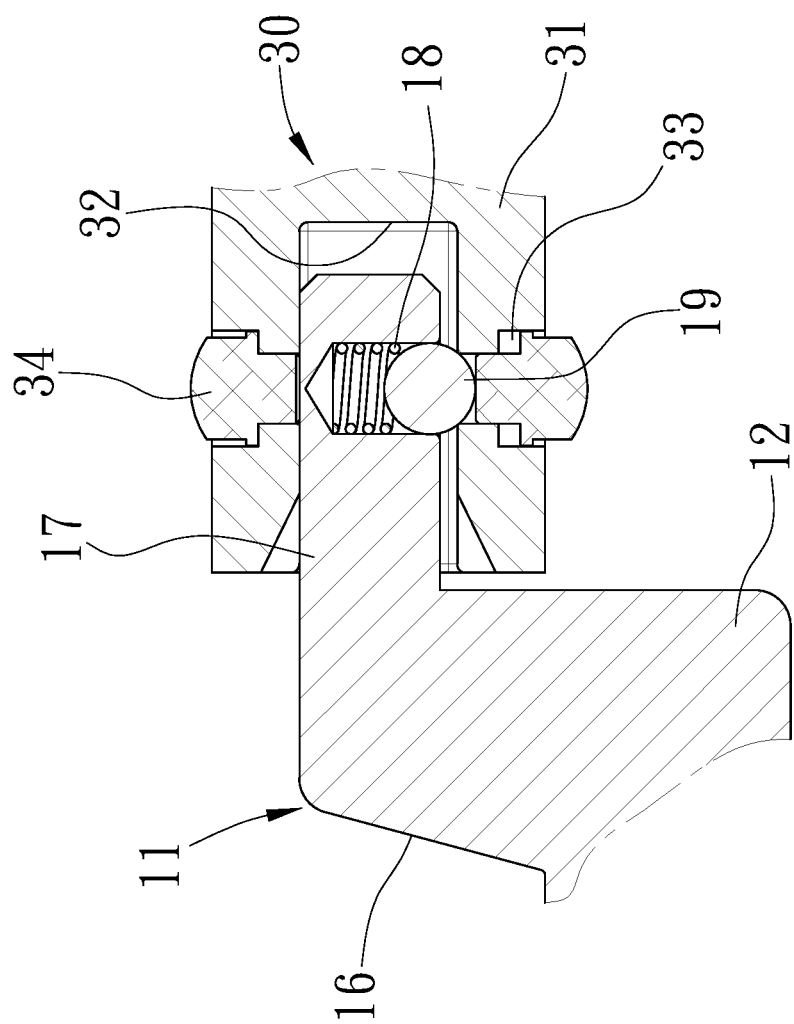
FIG. 9 is an enlarged, partial and cross-sectional view of the torque tool shown in FIG. 8.

Referring to FIGS. 8 and 9, the insert 17 is inserted in the bore 32. The second portion of the ball 19 pushes a first portion of a selected one of the buttons 34 into a selected one of the apertures 33 so that the second portion of the ball 19 enters the selected aperture 33 to keep the insert 17 in the bore 32. Now, a second portion of the selected button 34 sticks out of the selected aperture 33.

When the second portion of the selected button 34 is pushed in the selected aperture 33, the first portion of the button 34 pushes the second portion of the ball 19 out of the selected aperture 33 to allow movement of the insert 17 from the bore 32. Then, the bit 11 can be replaced with another bit.

The bit 11 including the stationary jaws 13 is in the form of a head of an open-ended wrench. Thus, the combination of the bit 11 with handle 30 becomes an open-ended wrench 10.

In operation, the contact faces 14 of the stationary jaws 13 are expected to contact two opposite facets of a workpiece such as a nut or a head or a threaded bolt. The workpiece cannot be located between the stationary jaws 13 if the distance between the opposite facets of the workpiece is larger than the distance between the contact faces 14 of the stationary jaws 13. The opposite facets of the workpiece cannot be in proper contact with the contact faces 14 of the stationary jaws 13 if the distance between the opposite facets of the workpiece is excessively smaller than the distance between the contact faces 14 of the stationary jaws 13. That is, the bit 11 is only useful for rotating a workpiece in a size.

Figure 4:
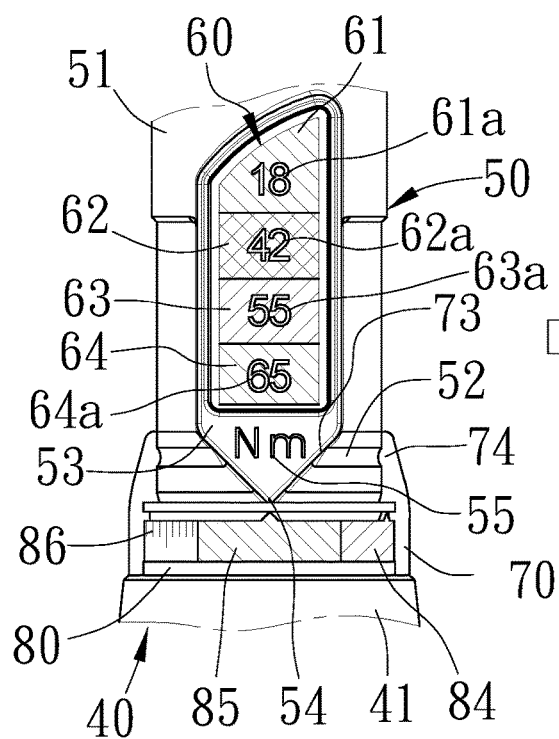
FIGS. 4 through 7 are enlarged top views of an indicating unit of the torque tool shown in FIG. 1.

Referring to FIGS. 4 and 8, the identification symbol 27 is located in the colored layer 23. The color of the colored layer 23 is identical or similar to the color of the colored area 64, and the color of the colored area 64 is identical or similar to the color of the fourth colored area 85. Hence, it is obvious that the scale ring 80 should be rotated to align the colored area 85 of the scale ring 80 with the pointer 54 so that the maximum value of torque that can be transferred by the handle 30 is set to be 65±5 Nm when the bit 11 of 29 mm is used. There is no need for memorizing or calculation.

Figure 10:
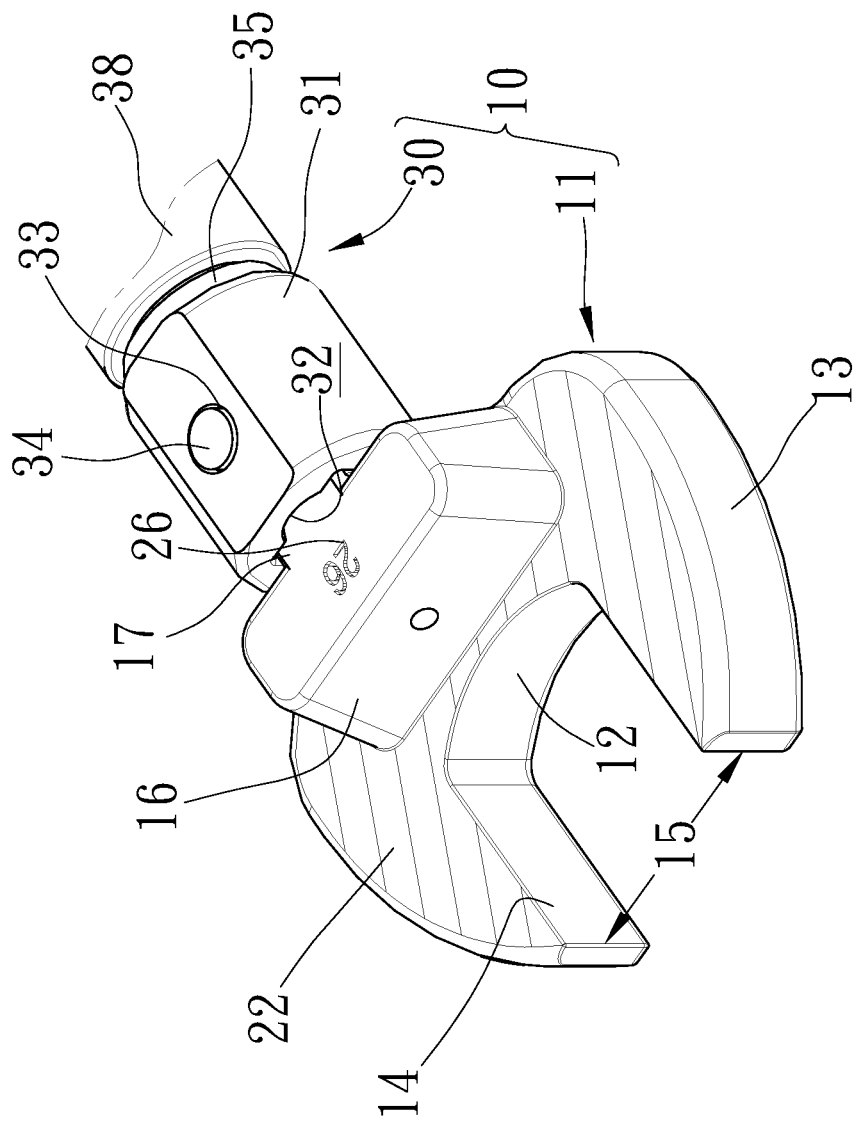
FIG. 10 is an enlarged, partial and perspective view of a torque tool according to the second embodiment of the present invention.

Referring to FIGS. 5 and 10, there is a wrench according to a second embodiment of the present invention. The second embodiment is like the first embodiment except for two things. Firstly, a colored layer 22 is supported on the head 12 instead of the colored layer 23 supported on the raised portion 16 of the bit 11. Secondly, an identification symbol 26 is supported on the raised portion 16 of the bit 11 instead of the identification symbol 27. The symbol 26 shows "26." The color of the colored layer 22 is identical or similar to the color of the colored area 63, and the color of the colored area 63 is identical or similar to the color of the fourth colored area 84. Hence, it is obvious that the scale ring 80 should be rotated to align the colored area 84 of the scale ring 80 with the pointer 54 so that the maximum value of torque that can be transferred by the handle 30 is set to be 55±5 Nm when the bit 11 of 26 mm is used. There is no need for memorizing or calculation.

Figure 11:
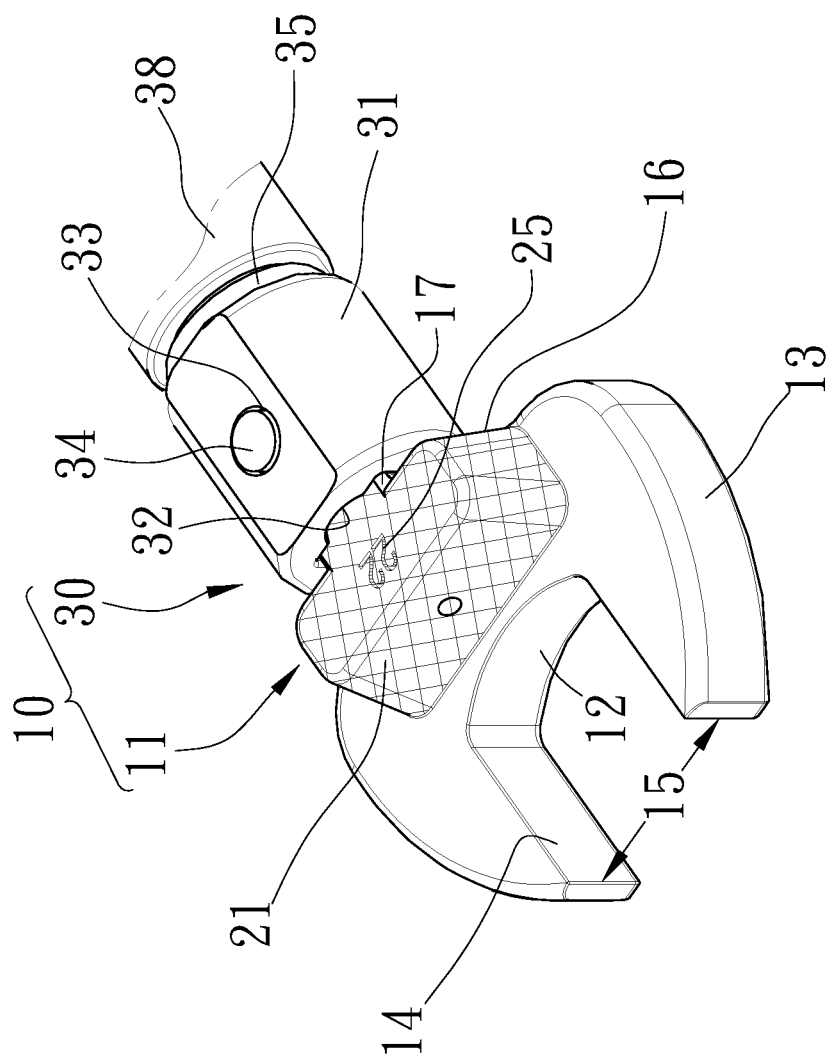
FIG. 11 is an enlarged, partial and perspective view of a torque tool according to the third embodiment of the present invention.

Referring to FIGS. 6 and 11, there is a wrench according to a third embodiment of the present invention. The third embodiment is like the first embodiment except for two things. Firstly, a colored layer 21 is supported on the raised portion 16 of the bit 11. Secondly, an identification symbol 25 is supported on the raised portion 16 of the bit 11 instead of the identification symbol 27. The symbol 25 shows "22." The color of the colored layer 21 is identical or similar to the color of the colored area 62, and the color of the colored area 62 is identical or similar to the color of the fourth colored area 83. Hence, it is obvious that the scale ring 80 should be rotated to align the colored area 83 of the scale ring 80 with the pointer 54 so that the maximum value of torque that can be transferred by the handle 30 is set to be 42±5 Nm when the bit 11 of 22 mm is used. There is no need for memorizing or calculation.

Figure 12:
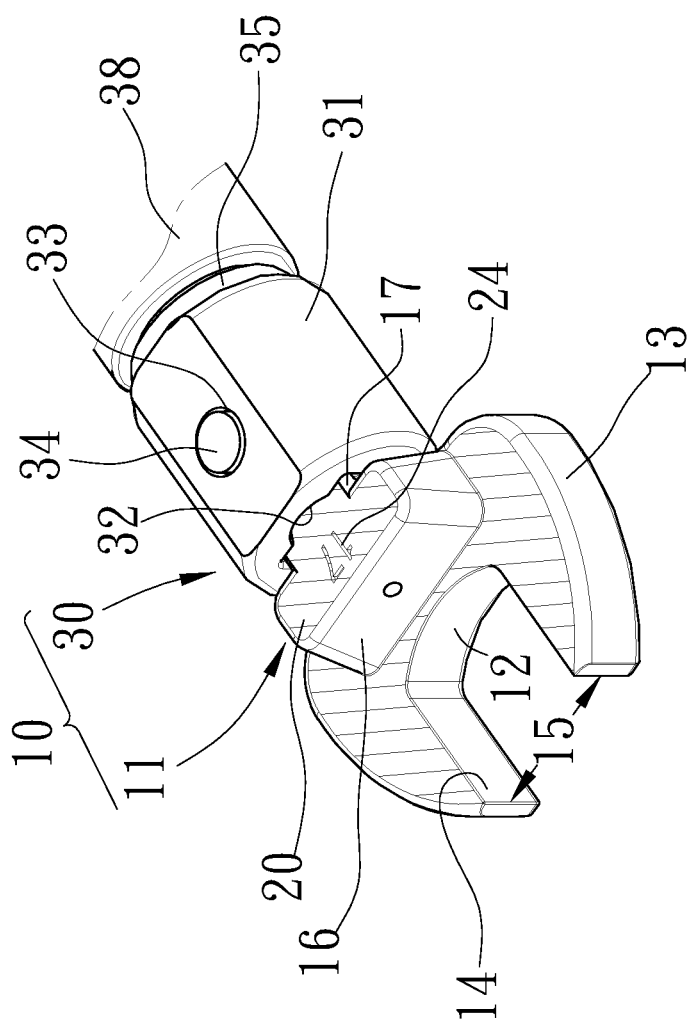
FIG. 12 is an enlarged, partial and perspective view of a torque tool according to the fourth embodiment of the present invention.

Referring to FIGS. 7 and 12, there is a wrench according to a fourth embodiment of the present invention. The fourth embodiment is like the first embodiment except for two things. Firstly, a colored layer 20 is supported on the head 12 and the raised portion 16 of the bit 11 instead of the colored layer 23 supported on the raised portion 16 of the bit 11. Secondly, an identification symbol 24 is supported on the raised portion 16 of the bit 11 instead of the identification symbol 27. The symbol 24 shows "17." The color of the colored layer 20 is identical or similar to the color of the colored area 61, and the color of the colored area 61 is identical or similar to the color of the fourth colored area 82. Hence, it is obvious that the scale ring 80 should be rotated to align the colored area 82 of the scale ring 80 with the pointer 54 so that the maximum value of torque that can be transferred by the handle 30 is set to be 18±5 Nm when the bit 11 of 17 mm is used. There is no need for memorizing or calculation.

A color coding is shown in a table as follows:

| Color | Size | Maximum Value of Torque (Nm) |
| --- | --- | --- |
| colored layer 20 and colored area 61 (or colored area 82) | 17 | 18 |

-continued

| Color | Size | Maximum Value of Torque (Nm) |
|---|---|---|
| colored layer 21 and colored area 62 (or colored area 83) | 22 | 42 |
| colored layer 22 and colored area 63 (or colored area 84) | 26 | 55 |
| colored layer 23 and colored area 64 (or colored area 85) | 29 | 65 |

The bits 11 according to the first to fourth embodiments are sorted in a group because they are all in the form of a head of an open-ended wrench and because each of them is formed with the insert 17 for engagement with the joint 31 of the handle 30. However, they bear different colored layers and symbols corresponding to different values of the distance between the contact faces 14 of the stationary jaws 13. Thus, they are operable to exert different maximum values of torque on workpieces in different sizes.

Figure 13:
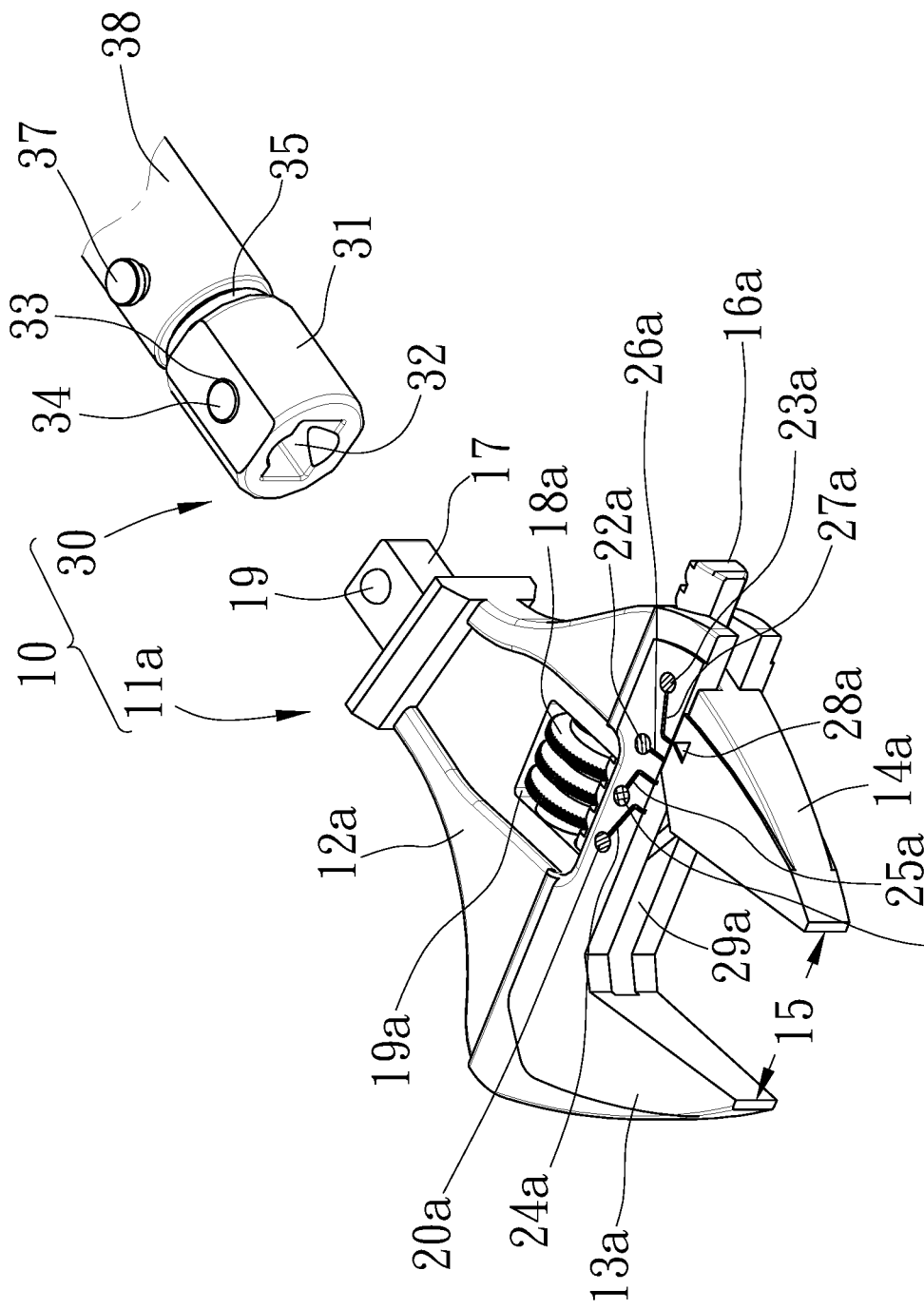
FIG. 13 is an enlarged, partial and perspective view of a torque tool according to the fifth embodiment of the present invention.

Referring to FIG. 13, there is shown a bit 11a according to fifth embodiment of the present invention. The bit 11a is in the form of a head of an adjustable wrench. The bit 11a is formed with the insert 17 for engagement with the joint 31 of the handle 30.

The bit 11a includes a head 12a, a stationary jaw 13a formed in one piece with the head 12a, and a movable jaw 14a movably connected to the head 12a. The head 12a includes a groove 29a in communication with an opening 19a. The movable jaw 14a is formed with a rack 16a. The rack 16a is movably inserted in the groove 29a. A worm 18a is rotationally inserted in the opening 19a. The worm 18a is engaged with the rack 16a so that the worm 18a is rotated to move the rack 16a in the groove 29a in operation. Accordingly, the movable jaw 14a is moved relative to the stationary jaw 13a.

The bit 11a includes colored layers 20a, 21a, 22a and 23a respectively connected to identification symbols 24a, 25a, 26a and 27a. The movable jaw 14a is provided with a pointer 28a in the form of a triangle or arrow head for alignment with one identification symbols 24a, 25a, 26a and 27a. The colored layer 20a and the identification symbol 24a are in a same color. The colored layer 21a and the identification symbol 25a are in a same color. The colored layer 22a and the identification symbol 26a are in a same color. The colored layer 23a and the identification symbol 27a are in a same color. The colored layers 20a, 21a, 22a and 23a are in different colors corresponding to the colored layers 61, 62, 63 and 64.

Figure 14:
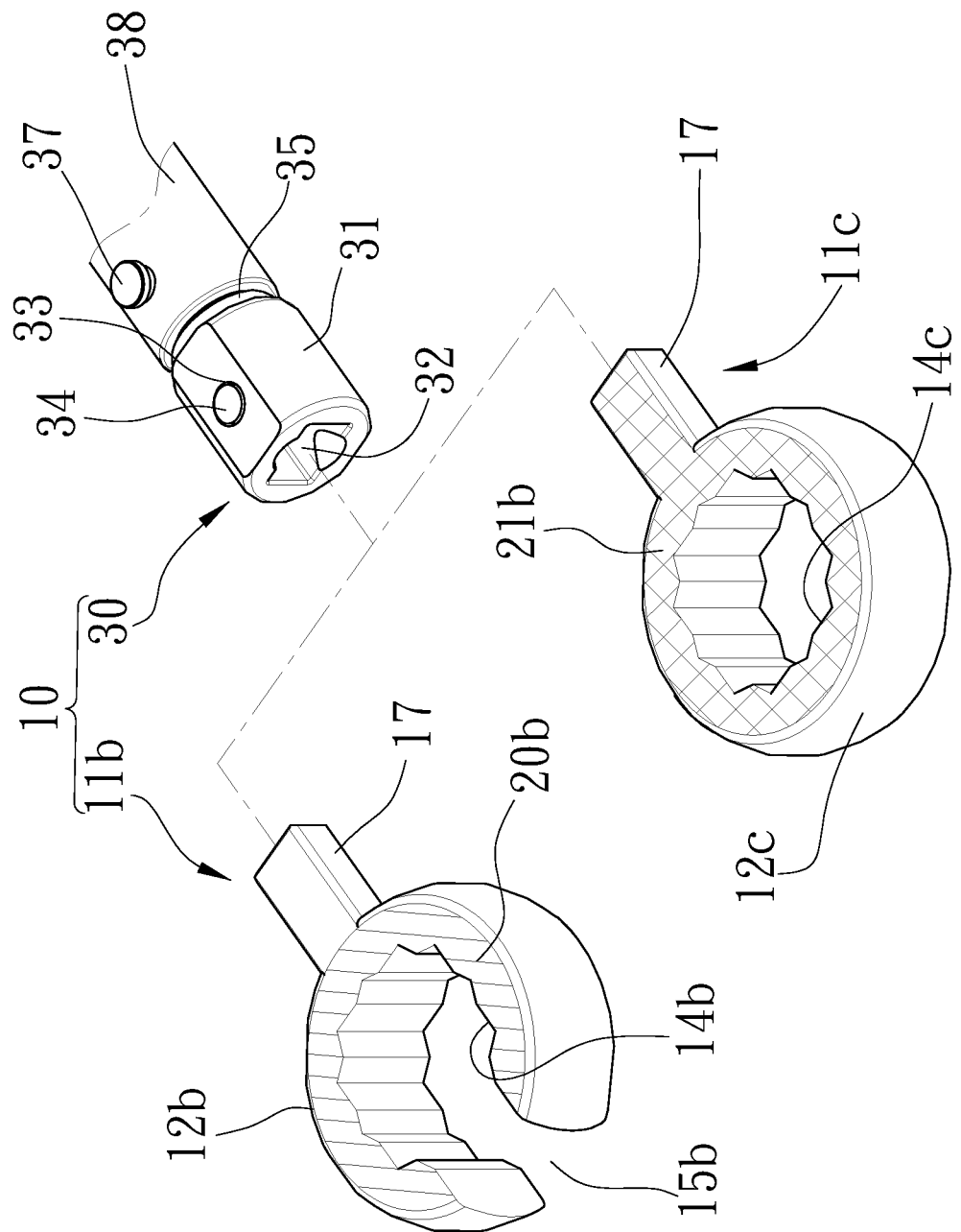
FIG. 14 is an enlarged, partial and exploded view of torque tools according to the sixth and seventh embodiments of the present invention.

Referring to FIG. 14, there is a bit 11b according to a sixth embodiment of the present invention and a bit 11c according to a seventh embodiment of the present invention.

The bit 11b is like the bit 11 except for including a C-shaped head 12b instead of the head 12. The head 12b includes two arched jaws (not numbered) each of which includes a free end so that the free ends of the jaws of the head 12b are separated from each other by a distance 15b. The head 12b includes contact facets 14b arranged like a star instead of the contact faces 14. For example, a colored layer 20b is supported on an upper face of the head 12b. According to the color coding, the maximum value of torque that can be transferred by the handle 30 is 18±5 Nm when the handle 30 is used with the bit 11b.

The bit 11c is like the bit 11b except for including an annular head 12c instead of the C-shaped head 12b. The head 12b includes contact facets 14c arranged like a star. For example, a colored layer 21b is supported on an upper face of the head 12c. According to the color coding, the maximum value of torque that can be transferred by the handle 30 is 42±5 Nm when the handle 30 is used with the bit 11c.

Figure 15:
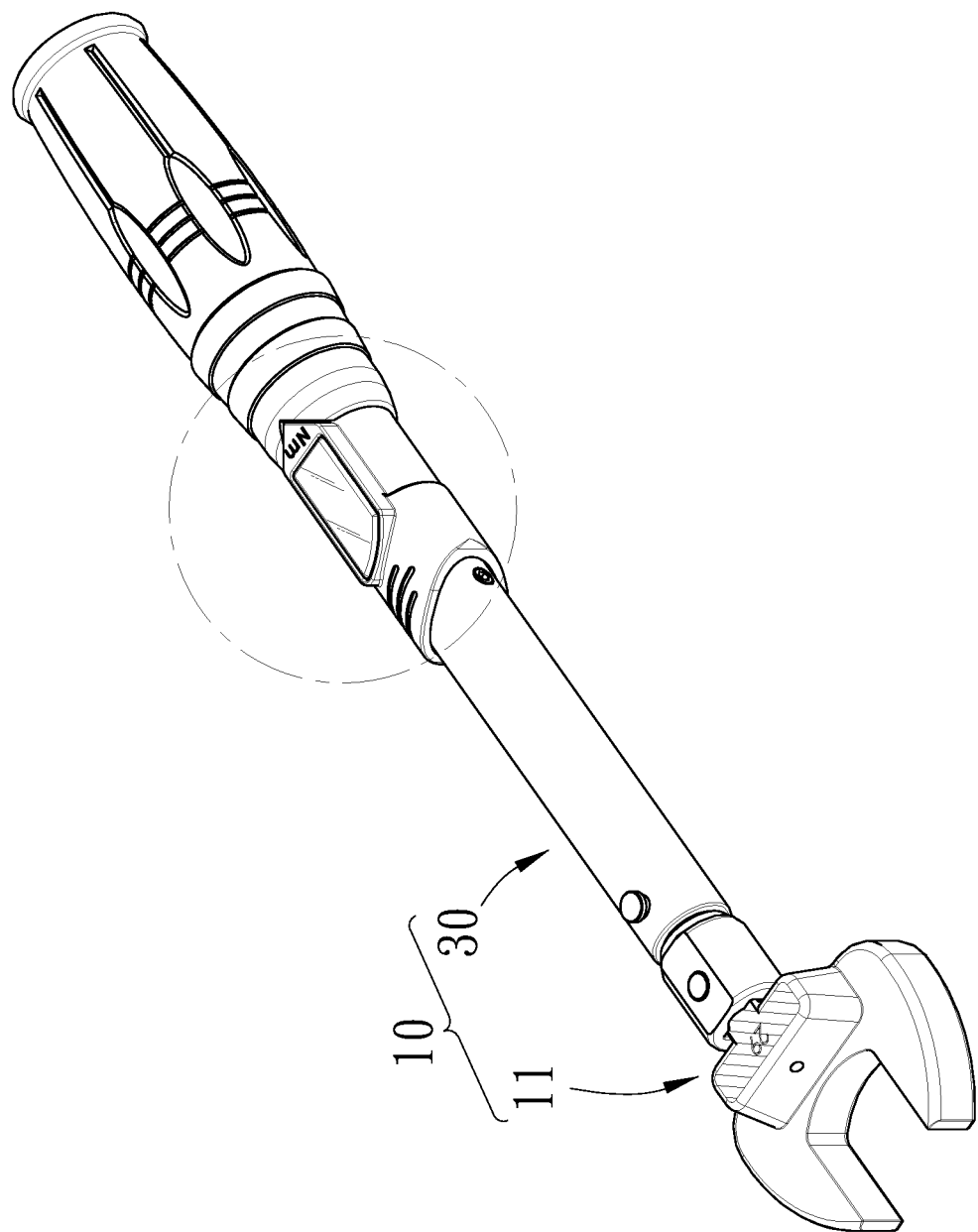
FIG. 15 is a perspective view of a torque tool according to the eighth embodiment of the present invention.
Figure 16:
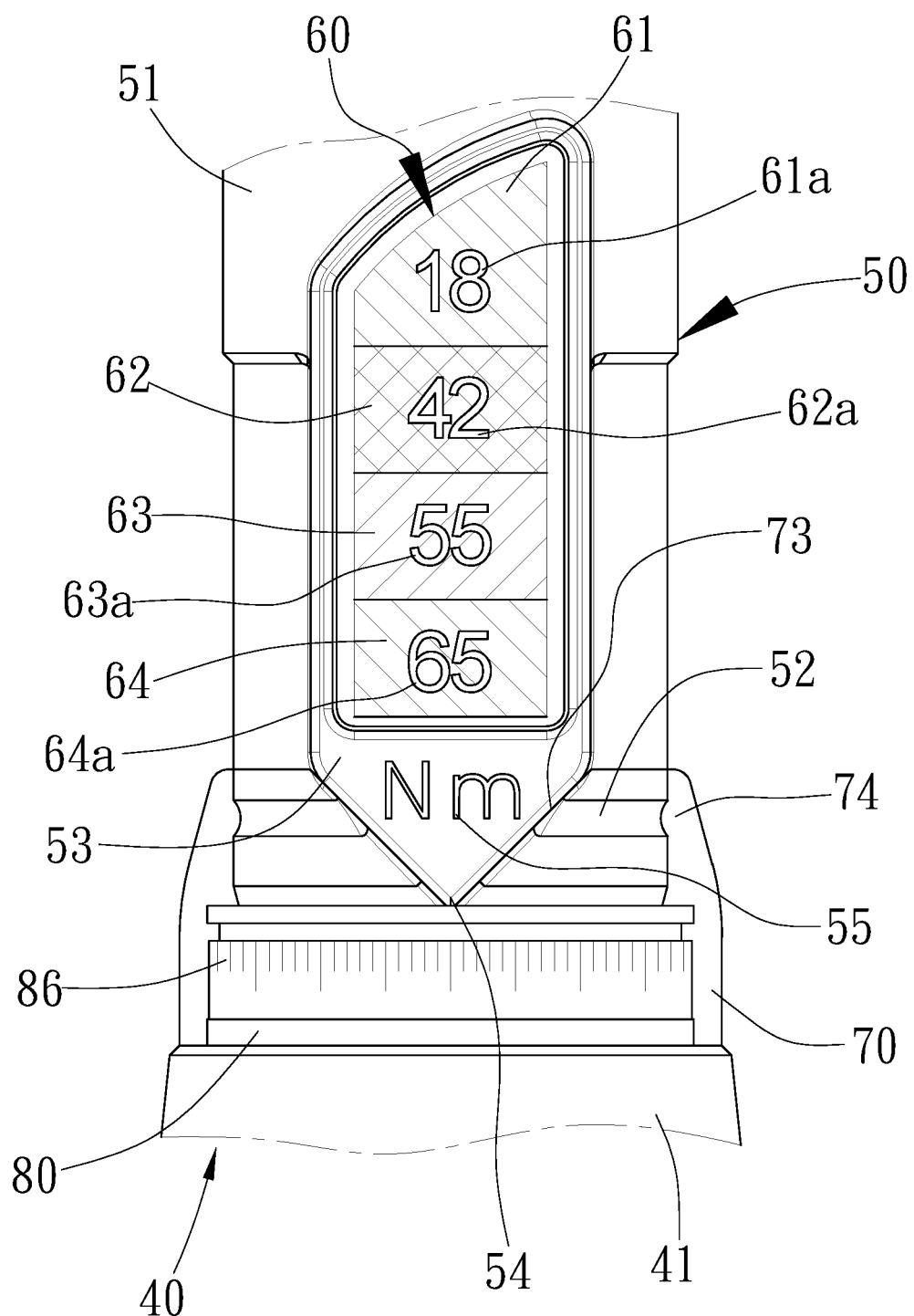
FIG. 16 is an enlarged top view of an indicating unit of the torque tool shown in FIG. 15.

Referring to FIGS. 15 and 16, there is shown a torque tool according to an eighth embodiment of the present invention. The eighth embodiment is like the first embodiment except that the scale ring 80 does not include any colored area. In operation, the scale ring 80 is rotated to align the pointer 54 with a value on the scale 86 according to the number 61a, 62a, 63a or 64a.

Figure 17:
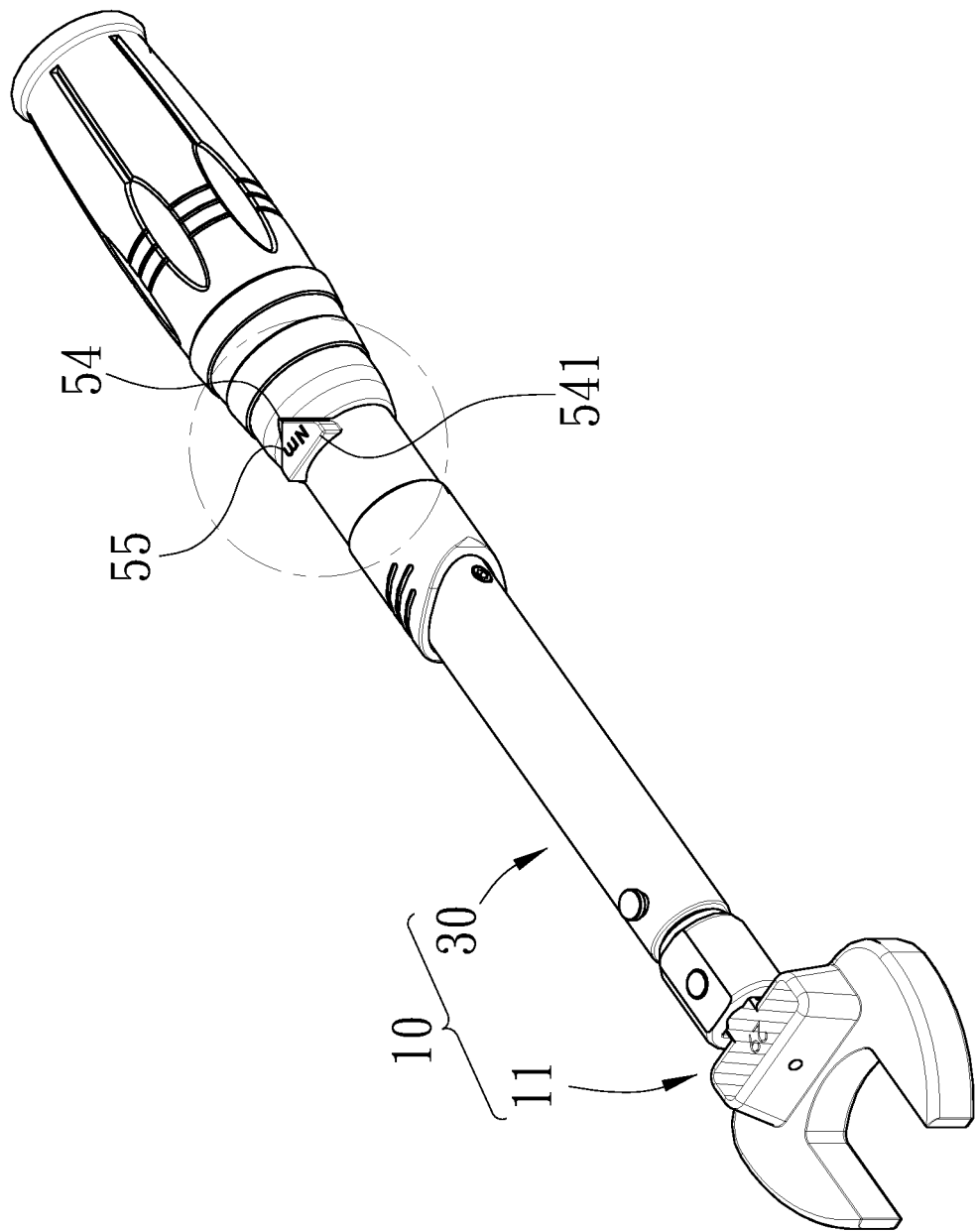
FIG. 17 is a perspective view of a torque tool according to the ninth embodiment of the present invention.
Figure 18:
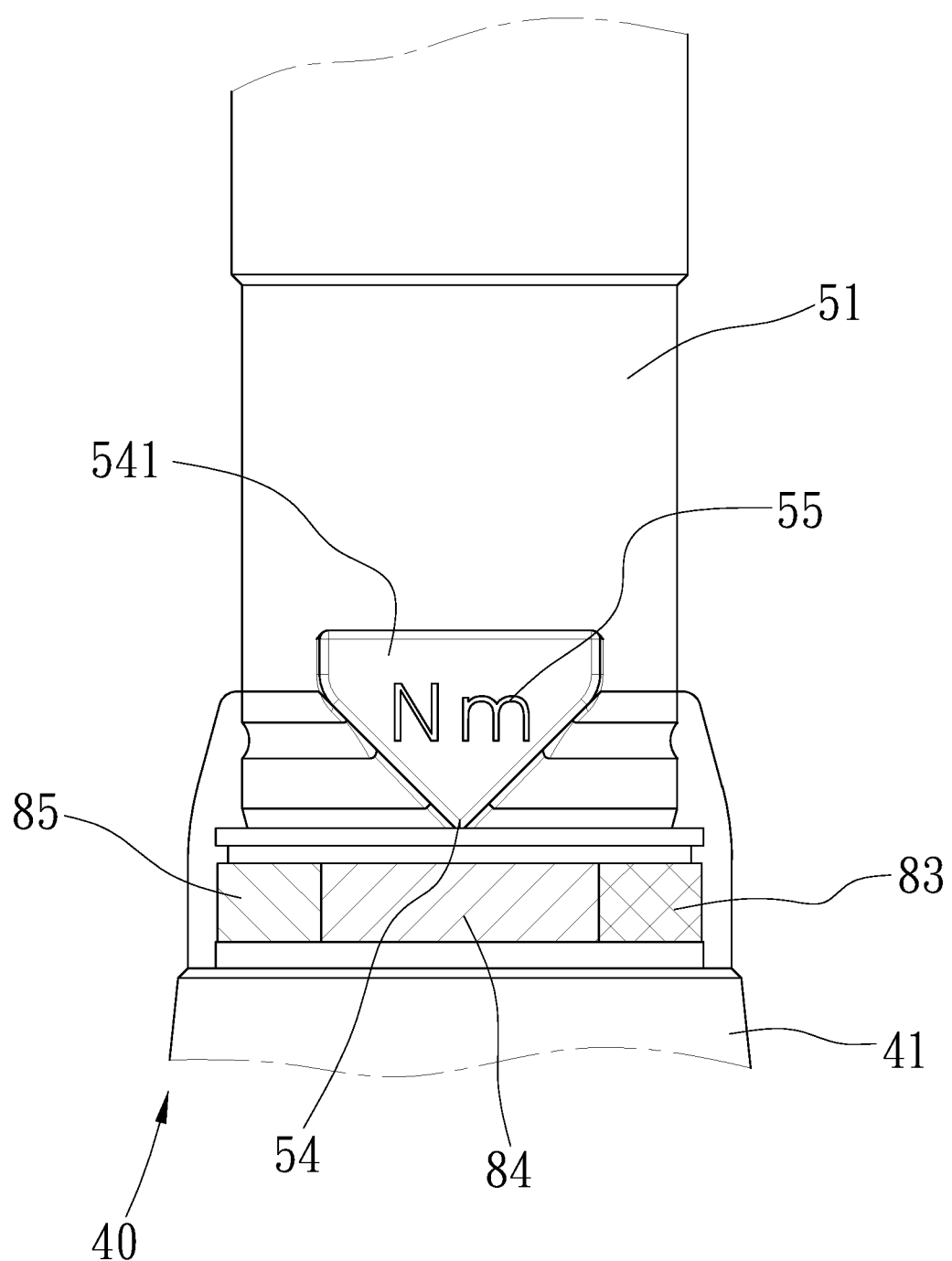
FIG. 18 is an enlarged, partial and top view of the torque tool shown in FIG. 17.

Referring to FIGS. 17 and 18, there is shown a torque tool according to a ninth embodiment of the present invention. The ninth embodiment is like the first embodiment except for including a block 541 instead of the indicating unit 50. The block 541 is in the form of a triangle or arrow head. The pointer 54 is a pointed portion of the block 541. In use, the scale ring 80 is rotated to align the colored area 82, 83, 84 or 85 with the pointer 54 according to the colored layer 20, 21, 22 or 23. For example, the colored area 84 is aligned with the pointer 54 according to the colored layer 22 of the bit 11. Hence, the maximum value of torque that can be transferred by the handle 30 is 55±5 Nm.

Figure 19:
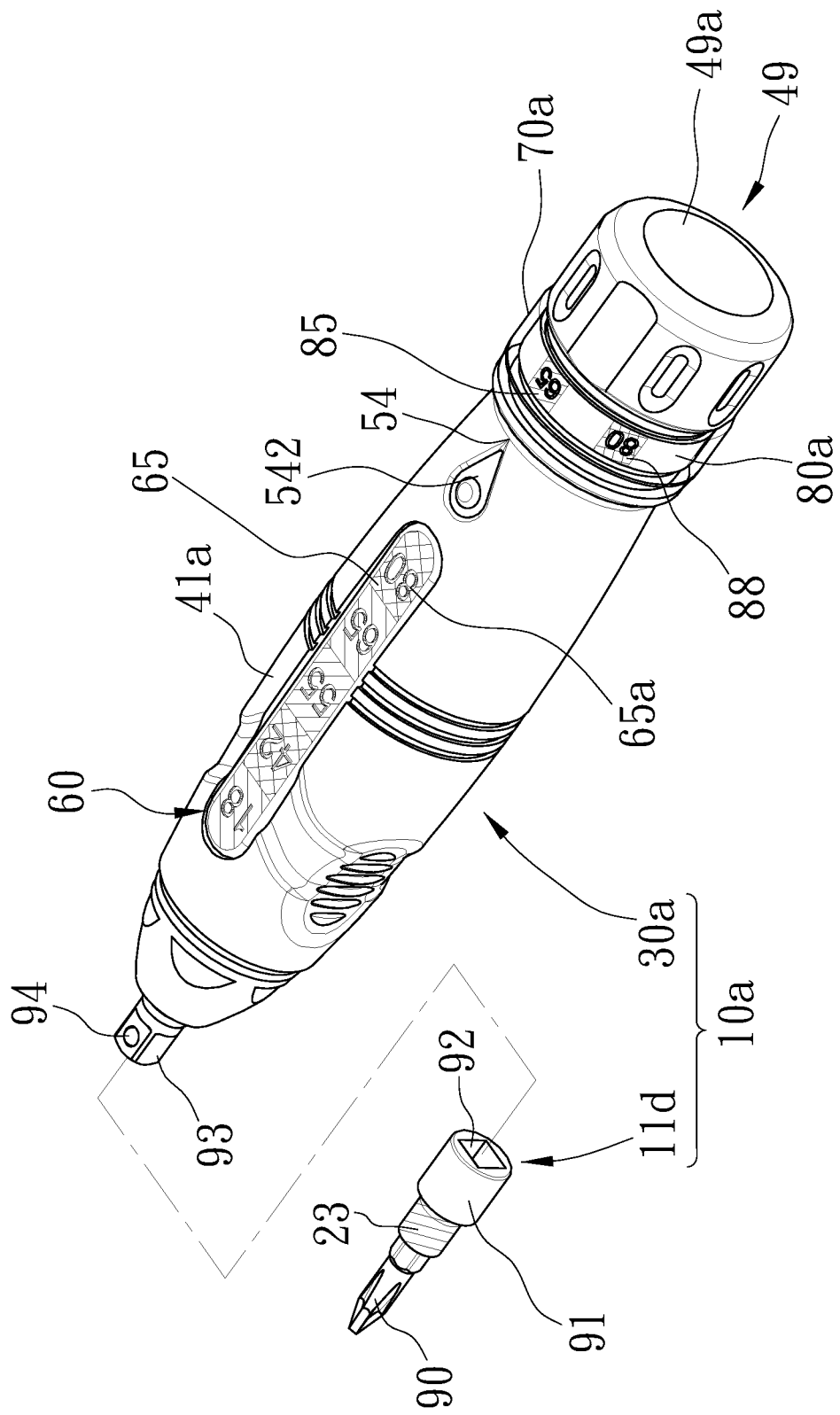
FIG. 19 is an exploded view of a torque tool according to the tenth embodiment of the present invention.
Figure 20:
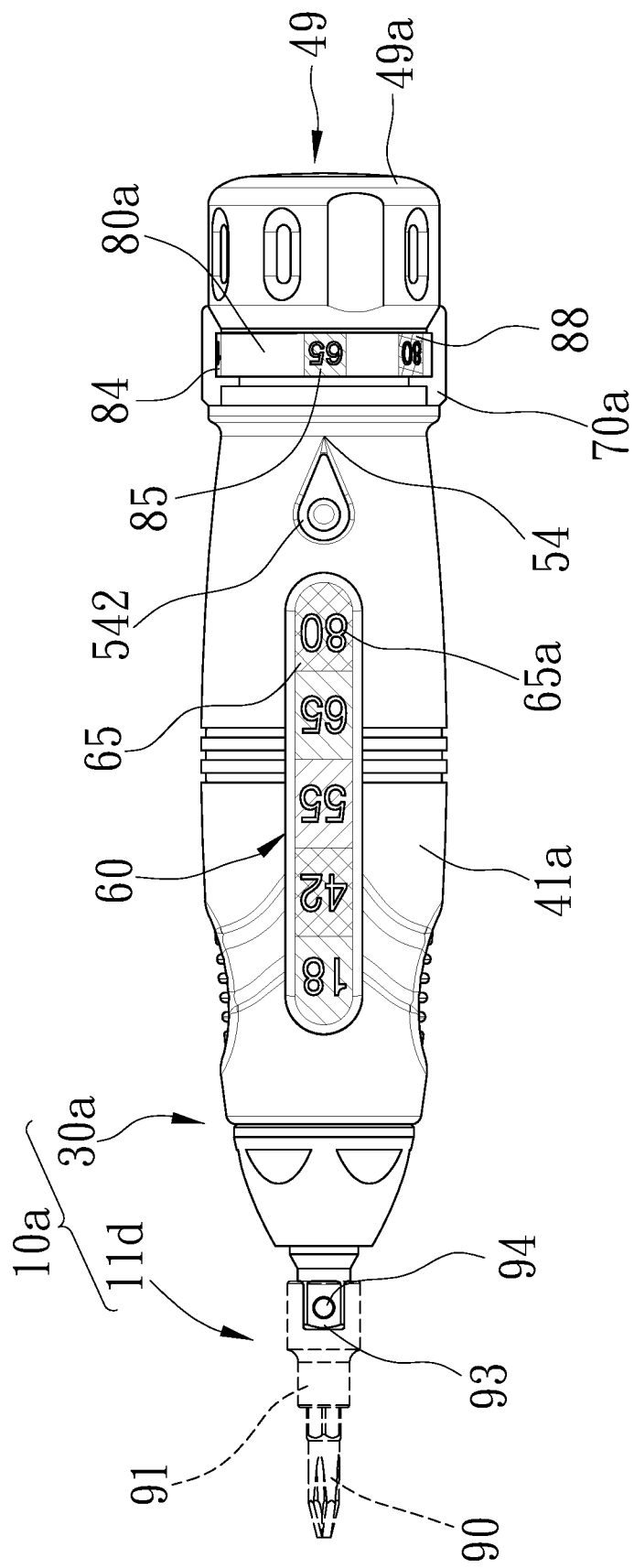
FIG. 20 is a perspective view of the torque tool shown in FIG. 19.

Referring to FIGS. 19 and 20, there is shown a torque tool according to a tenth embodiment of the present invention. The tenth embodiment is like the first embodiment except for several things. Firstly, the tenth embodiment is a screw driver 10a, not a wrench 10.

Secondly, the screw driver 10a includes a bit 11d instead of the bit 11. The bit 11d is in the form of a screw driver without a grip. The bit 11d includes cruciform tip 90 at an end, a socket 91 at an opposite end, and a non-circular bore 92 in the socket 91. The bit 11d includes a middle section provided with a colored layer 23 for example.

Thirdly, the screw driver 10a includes a handle 30a instead of the handle 30. The handle 30 includes a grip 41a, a non-circular insert 93 extending from a front end of the grip 41a, and a spring-biased ball 94 supported on the non-circular insert 93. The non-circular insert 93 is inserted in the non-circular bore 92 to connect the handle 30a to the bit 11d. The ball 94 abuts against a wall of the non-circular bore 92 to keep the bit 11d on the handle 30a.

Fourthly, the grip 41a includes a knob 49a provided at a rear end. The knob 49a is a component of the controller 49. A non-movable lens 70a is provided between the knob 49a and the grip 41a. The lens 70a protectively covers a scale ring 80a.

Fifthly, the grip 41a is formed with a recess 542 instead of the frame 53. The pointer 54 is a pointed portion of the recess 542. The pointer 54 extends toward the scale ring 80a.

Sixthly, the label 60 includes an additional colored area 65 and a number 65a located in the colored area 65. Similarly, the number 65a represents a maximum value of torque transferable via the handle 30a.

Seventhly, a scale ring 80a is used instead of the scale ring 80. The scale ring 80a is like the scale ring 80 except for including an additional colored area 88. Moreover, each of the colored areas 82, 83, 84, 85 and 88 is provided with a number to represent a maximum value of torque that can be transferred by the handle 30a.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A torque tool comprising:

multiple bits each of which comprises a colored area;

a handle for connection to a selected one of the bits, wherein the handle is operable to set multiple maximum values of torque transferable to the bit from the handle corresponding to the colored areas of the bits;

a label supported on the handle, wherein the label comprises multiple colored areas corresponding to the colored areas of the bits and multiple numbers located in the colored areas of the label corresponding to the maximum values of torque;

a pointer formed on the handle; and a scale ring rotated around the handle as the handle is operated to set the maximum values of torque, thereby aligning the pointer with a value on the scale ring according to one of the numbers in a corresponding one of the colored areas of the label corresponding to the colored area of a selected one of the bits.

2. The torque tool according to claim 1, wherein the handle comprises a frame and a cavity in the frame, wherein the label is inserted in the cavity.

3. The torque tool according to claim 2, comprising a transparent panel connected to the frame to keep the label in the cavity.

4. The torque tool according to claim 3, wherein the label is printed on a lower face of the transparent panel.

5. The torque tool according to claim 2, wherein the pointer is a pointed portion of the frame extending toward the scale ring.

6. The torque tool according to claim 5, comprising a unit of torque located between the pointer and the cavity.

7. The torque tool according to claim 1, wherein the label comprises four colored areas.

8. The torque tool according to claim 1, wherein the scale ring comprises multiple colored areas corresponding to the colored areas of the label, wherein each of the colored areas of the scale ring represents one of the maximum values of torque.

9. The torque tool according to claim 8, wherein the scale ring comprises four colored areas, wherein the label comprises four colored areas.

10. The torque tool according to claim 1, comprising a lens extending around the handle to cover the scale ring.

11. A torque tool comprising:

multiple bits each of which comprises a colored area;

a handle for connection to a selected one of the bits, wherein the handle is operable to set multiple maximum values of torque transferable to the bit from the handle corresponding to the colored areas of the bits;

a pointer formed on the handle; and a scale ring comprising multiple colored areas corresponding to the colored areas of the bits, wherein the scale ring is rotated around the handle as the handle is operated to set the maximum values of torque, thereby aligning the pointer with one of the colored areas of the scale ring corresponding to the colored area of a selected one of the bits.

12. The torque tool according to claim 11, wherein the scale ring comprises four colored areas.

13. The torque tool according to claim 11, comprising a block formed on the handle, wherein the pointer is a pointed portion of the block extending toward the scale ring.

14. The torque tool according to claim 13, wherein the block comprises a unit of torque on an upper face.

15. The torque tool according to claim 11, comprising a recess in the handle, wherein the pointer is a pointed portion of the recess extending toward the scale ring.

16. The torque tool according to claim 11, comprising a lens extending around the handle to cover the scale ring.

17. The torque tool according to claim 11, wherein the scale ring comprises numbers located in the colored areas of the scale ring, respectively.

* * * * *